US009766065B2

(12) United States Patent
Garcia et al.

(10) Patent No.: US 9,766,065 B2
(45) Date of Patent: Sep. 19, 2017

(54) REDUCTION OF ALTITUDE ERROR USING FORECASTED ATMOSPHERIC PRESSURE DATA

(71) Applicant: Exelis Inc., McLean, VA (US)

(72) Inventors: Michael A. Garcia, Herndon, VA (US);
Robert Mueller, Herndon, VA (US);
Eric Innis, Herndon, VA (US); Boris Veytsman, Herndon, VA (US)

(73) Assignee: Exelis Inc., McLean, VA (US)

( * ) Notice: Subject to any disclaimer, the term of this patent is extended or adjusted under 35 U.S.C. 154(b) by 983 days.

(21) Appl. No.: 13/840,050

(22) Filed: Mar. 15, 2013

(65) Prior Publication Data

US 2014/0278182 A1 Sep. 18, 2014

(51) Int. Cl.
*G01C 17/38* (2006.01)
*G01B 21/04* (2006.01)
*G01C 5/06* (2006.01)

(52) U.S. Cl.
CPC ............ *G01B 21/045* (2013.01); *G01C 5/06* (2013.01)

(58) Field of Classification Search
CPC ............................... G01B 21/045; G01C 5/06
USPC .......................................................... 72/95
See application file for complete search history.

(56) References Cited

U.S. PATENT DOCUMENTS

| 5,940,035 | A  | * | 8/1999  | Hedrick ............... G01C 5/005 340/977 |
| 6,253,166 | B1 | * | 6/2001  | Whitmore ............ G01P 13/025 700/89 |
| 6,804,614 | B1 | * | 10/2004 | McGraw ................. G01C 5/06 701/4 |
| 7,650,232 | B1 | * | 1/2010  | Paielli .................. G01C 23/005 340/963 |
| 7,702,427 | B1 | * | 4/2010  | Sridhar .................. G08G 5/045 701/14 |
| 2004/0215394 | A1 | * | 10/2004 | Carpenter, Jr. ......... G01W 1/10 702/3 |

(Continued)

OTHER PUBLICATIONS

Michael A. Garcia et al., "An Enhanced Altitude Correction Technique for Improvement of WAM Position Accuracy," 2012 Integrated Communications Navigation and Surveillance (ICNS) Conference, Apr. 24-26, 2012.

(Continued)

*Primary Examiner* — Stephanie Bloss
(74) *Attorney, Agent, or Firm* — Edell, Shapiro & Finnan LLC

(57) ABSTRACT

A technique for reducing altitude error involves determining a corrected altitude for an aircraft using forecast atmospheric pressure data available, for example, from a weather forecasting service. The forecast atmospheric pressure data includes, for a number of points in time and for a number of geographic locations, a set of pressure levels and corresponding altitude values. Altitude correction data is periodically calculated from the forecast atmospheric pressure data for each of a number of geographic grid points. Upon receiving aircraft position information and an aircraft altitude measurement for an aircraft, one or more of the geographic grid points corresponding to the aircraft position are identified, and a corrected altitude of the aircraft is determined based on the altitude correction data of the one or more geographic grid points.

20 Claims, 10 Drawing Sheets

(56) References Cited

U.S. PATENT DOCUMENTS

2006/0271297 A1* 11/2006 Repelli .................. G01W 1/10
 702/3
2010/0274542 A1* 10/2010 Krupansky ............. G01W 1/10
 703/6
2012/0265373 A1  10/2012 Ingvalson et al.

OTHER PUBLICATIONS

Wynnyk, C. M., "Wind Analysis in Aviation Applications," Digital Avionics Systems Conference, 2012 IEEE/AIAA, pp. 5C2-1, Oct. 14, 2012.
Zhang, Y. et al., "Application of the Rapid Update Cycle (RUC) to Aircraft Flight Simulation," ASME 2008 International Mechanical Engineering Congress and Exposition, vol. 14:45-43 (2008).
European Search Report in corresponding European Patent Application No. 14 15 9109 dated Jun. 6, 2014.

\* cited by examiner

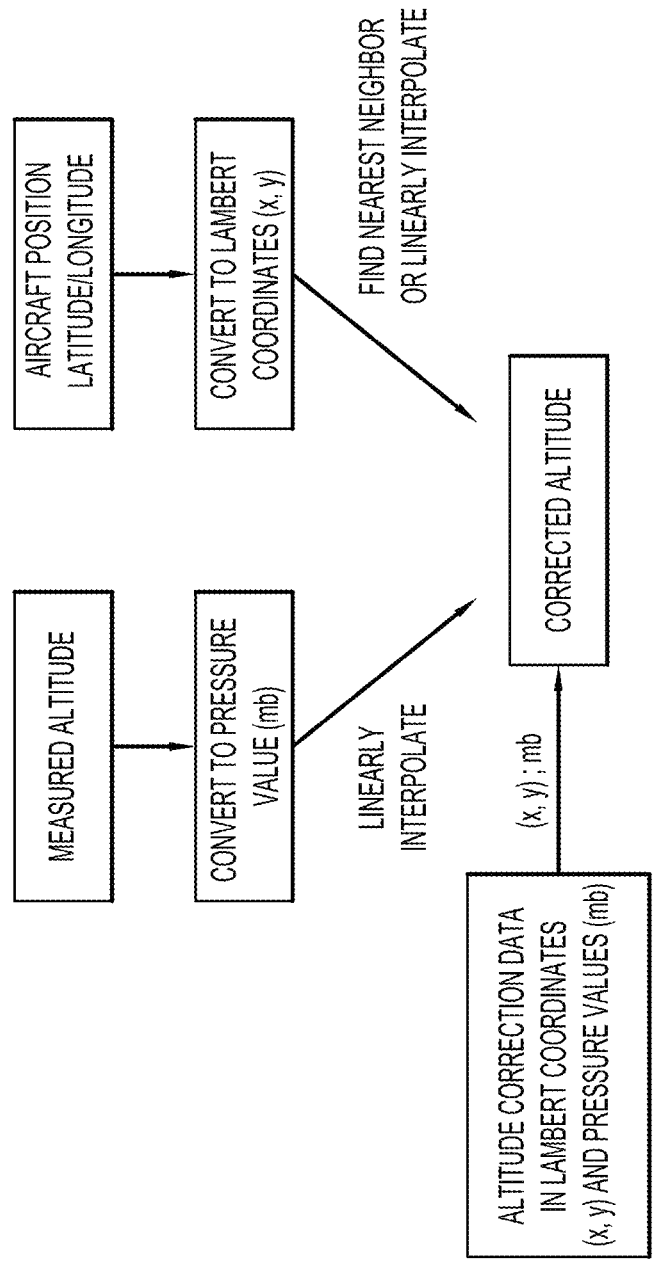

REDUCTION OF ALTITUDE ERROR USING FORECASTED ATMOSPHERIC PRESSURE DATA

GOVERNMENT LICENSE RIGHTS

This invention was made with government support under Contract No. DTFAWA-07-C-00067. The government has certain rights to the invention.

BACKGROUND

Orthogonal Wide Area Multilateration (WAM) is being considered as one of the primary backup sources of air traffic surveillance to Automatic Dependent Surveillance-Broadcast (ADS-B) in the National Airspace System (NAS). Radar is currently the primary source of air traffic surveillance, with ADS-B poised to succeed radar in coming years. WAM service could serve as both a transition to full ADS-B service and a cost-saving backup surveillance alternative to radar maintenance and expansion.

One of the challenges associated with WAM is the accuracy of the aircraft's reported altitude. The standard way to estimate the altitude of an aircraft leading up to the advent of GPS is the aneroid altimeter. This device actually does not measure altitude but rather the atmospheric pressure outside the cabin. Since atmospheric pressure decreases as altitude increases, pressure data can be converted to altitude data based on the Standard Atmospheric Model tables or formulas. Although the altimeter designs have changed through the years, their method for changing the offset for mean sea level (MSL) is universal. This feature allows the pilot to apply a static offset to the MSL pressure based on a recent nearby barometric reading. This is called the QNH or "altimeter setting" which is available from most airfields via radio voice communication or other methods.

Avionics may have access to a variety of altitude measurements via the aircraft's data bus (e.g. ARINC), including the raw output from the barometric altimeter (reported altitude), altitude indicated on the altimeter dial (indicated altitude), and height above ellipsoid (HAE) which is generated by an onboard GPS system. Aircraft transponders typically include reported altitude in their downlink message transmissions. Examples include Mode C (resolution 100') for air-traffic control radar beacon system (ATCRBS), DF4 (resolution 25' or 100') for Mode S, and the ADS-B Airborne Position Message/State Vector Element (resolution 25' or 100') for ADS-B. In the case of ADS-B, GPS derived height above ellipsoid (HAE) may be reported as well in the messages transmitted.

There are several reasons why application of the Standard Atmospheric Model fails to yield an accurate reported altitude from pressure measurements. First, surface atmospheric pressure is not constant and varies with the area and time. Second, surface temperature is not constant. Since air density decreases with temperature, moving from a warm area to a colder one leads to the real altitude being lower than the indicated one. Third, air composition is not constant. The most varying component is water vapor: humidity influences the pressure lapse rate. Thus, flights in the pre-GPS times (or in the uncertain GPS reception conditions, like those in the mountainous regions) required rather frequent adjustments of altimeter settings based on the guidance from Air Traffic Control (ATC). Even this could not guarantee the accuracy of the altitude data since atmospheric conditions for pilots served by the same ATC are different.

Multilateration (MLAT) systems provide a reasonably cost-effective surveillance solution in areas where conventional radar would be ineffective, such as in mountainous regions. A typical MLAT system includes four or more spatially distributed ground receivers, each of which is networked to a central processor. The receivers are positioned so that when aircraft under surveillance transmit ADS-B squitters or replies to ATCRBS or Mode S interrogations, the RF message is received at each station. Precise time of message receipt and relevant aircraft ID and status information are forwarded to the central processor from each receiver. The central processor then time-clusters the received reports and estimates the position of the aircraft based on the time-difference-of-arrival (TDOA) at the respective ground stations. Since a minimum of three linearly independent time differences are needed to form a three-dimensional position solution (e.g., x,y,z), receptions from at least four stations are required. When more than four receptions are available, a least squares solution (typically maximum likelihood) may be applied so that no information is wasted.

With airborne targets, the worst position error produced by 3D MLAT is generally in the vertical direction. To mitigate such errors in MLAT systems, Mode C altitude measurements reported by the aircraft can be incorporated into the MLAT position solution process. Use of Mode C altitude in MLAT reduces the number of TDOAs required from three to two, thus reducing the number of ground station receptions required from four to three. Use of aircraft reported altitude therefore provides two major benefits in MLAT: improvement of estimate of altitude; and reduction in the number of ground stations required to provide surveillance.

However, errors in reported altitude or "altitude bias" can have a dramatic impact on errors in the horizontal position estimation, and uncorrected altitude errors have the potential to cause severe surveillance problems in multilateration systems. Known solutions of reducing altitude error in multilateration include: accepting the given error conditions and increasing separation standards; employing pressure sensors at the airport and adjusting altitudes similarly to match indicated altitude; avoiding use of altitude data in the multilateration solution; and employing range-aided multilateration. The first option is unacceptable if a robust multilateration system is desired. The second option, use of a surface pressure sensor, can be helpful in some cases, but is a poor solution when unusual altitude/temperature lapse rates are encountered (e.g., temperature inversion). The third option avoids altitude errors, but is prone to much higher jitter, especially in the vertical dimension. Range-aided multilateration has the potential to reduce the jitter problems but suffers from several shortcomings such as: requiring interrogation which can suffer from poor detection in high traffic environments; and specifications for aircraft avionics response time to interrogations are large and result in deficiencies in position accuracy.

Thus, there remains a need for an efficient and more accurate way to correct errors in reported altitude received from aircraft to support multilateration and other potential applications for altitude information.

SUMMARY

Described herein is a technique for reducing altitude error for an aircraft using forecast atmospheric pressure data available from a weather forecasting service, for example, Rapid Update Cycle (RUC) weather data provided by the National Oceanic and Atmospheric Administration (NOAA) in the U.S. The forecast atmospheric pressure data includes, for a plurality of points in time and for a plurality of geographic locations (e.g., grid points in the Lambert coordinate system), a set of pressure levels and corresponding geopotential height (true altitude) values. Altitude correction data is periodically calculated from the forecast atmospheric pressure data for each of a plurality of geographic grid points such as grid points in the Lambert coordinate system or periodic points of longitude and latitude.

For example, the altitude correction data can be in the form of a current altitude value at each of a plurality of pressure levels for each geographic grid points. The current altitude value at each grid point and pressure level can be computed by interpolating in time between the forecast atmospheric pressure data for two points in time, e.g., the most recently received "current" altitude and the altitude forecasted at a next future point in time.

Upon receiving aircraft position information and an aircraft altitude measurement for an aircraft, one or more of the geographic grid points corresponding to the aircraft position are identified, and a corrected altitude of the aircraft is determined based on the altitude correction data of the one or more geographic grid points. For example, a set of geographic grid points can be identified whose locations define a region surrounding the aircraft position, and a corrected altitude at each of the set of geographic grid points can be determined as a function of the aircraft altitude measurement. The corrected altitude of the aircraft can then be computed by interpolating among the corrected altitudes at the set of geographic grid points based on a relative location of the aircraft position and the set of geographic grid points. The corrected altitude determined in this manner can be used in a multilateration computation to more accurately determine an aircraft's position in three dimensions and can also be reported to other sub-systems of an air traffic control system.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIGS. 5A-5D are diagrams illustrating different computational approaches to implementing the inventive concepts described herein.

DETAILED DESCRIPTION

Described herein is a new technique for accurately and efficiently determining altitude of aircraft by correcting aircraft-measured altitude based on forecast atmospheric pressure available from a weather modeling and forecast system, such as the Rapid Update Cycle (RUC) analysis-forecast system developed and maintained by the NOAA National Centers for Environmental Prediction (NOAA/NCEP) in the U.S. In the RUC system, forecasts are assimilated periodically (e.g., once per hour) and are seeded with data from Meteorological Aviation Reports (METAR), Mesonet, radiosondes, Geostationary Operational Environmental Satellites (GOES), aircraft and ship reports, weather radar, and various other sources. RUC forecasts include a product called HGT which contains geopotential height data (equivalent to true altitude) for up to 50 different isobars (contours of constant pressure). The grid is available in 40, 20, or 13 km using the Lambert coordinate system.

The RUC HGT product allows the prediction of the true altitude at any given pressure using interpolation. As previously explained, an aircraft's reported altitude is actually a better measure of pressure than altitude. Therefore, an aircraft's measured pressure can be determined from reported altitude using the same altitude-pressure relationship employed by the aircraft (e.g., either a formula or a Standard Atmospheric Model table). The true altitude of the aircraft can then be determined by interpolating its measured pressure to the isobars from the RUC HGT product in the vicinity of the aircraft. As will be explained below in greater detail, the forecast atmospheric pressure data can be applied in a variety of ways to correct an aircraft's reported altitude. At a general level, the technique involves collecting the raw forecast atmospheric pressure data from a source provider such as a weather service and generating altitude correction data in a suitable format from the raw forecast atmospheric pressure data. The reported (measured) altitude of an aircraft at specified location can be corrected based on the relevant altitude correction data for that location and reported altitude at that time.

As used herein and in the claims, the term "aircraft" refers to any airborne piloted or unmanned vehicle or platform, including but not limited to propeller-driven and jet-propelled fixed-wing airplanes, helicopters, rocket-propelled delivery systems (e.g., missiles), and balloons and airships (e.g., blimps).

Figure 1:
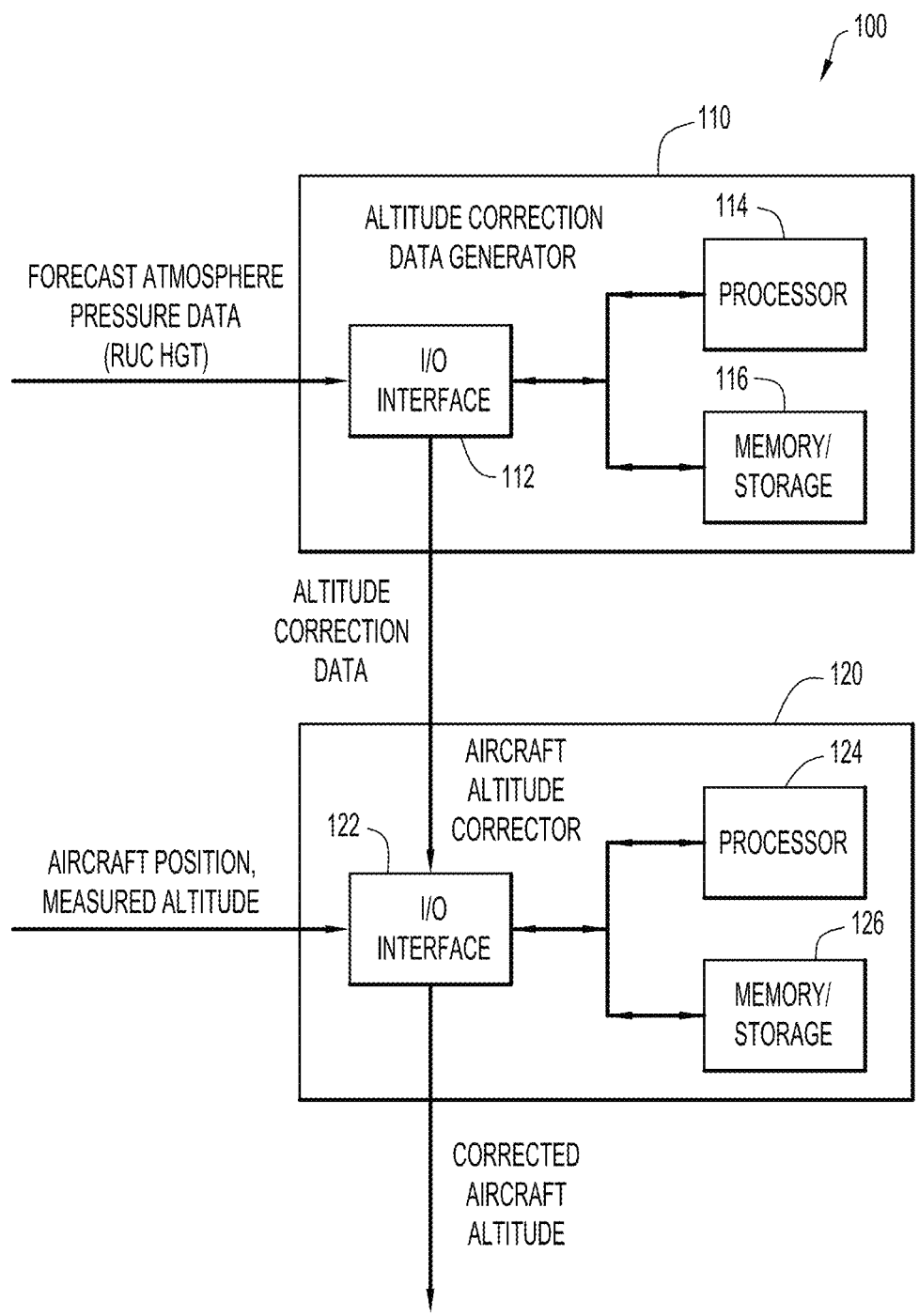
FIG. 1 is functional block diagram illustrating an altitude correction system in accordance with an example implementation of the inventive concepts described herein.

FIG. 1 is a block diagram of an altitude correction system 100 useful for explaining the inventive concepts described herein. Conceptually, altitude correction system 100 includes an altitude correction data generator 110 and an aircraft altitude corrector 120. Altitude correction data generator 110 is responsible for generating altitude correction data in a suitable format from raw forecast atmospheric pressure data, such as RUC HGT data. Aircraft altitude corrector 120 is responsible for applying the altitude correction data to received aircraft measurements. By way of example, aircraft altitude corrector 120 can be implemented as part of a multilateration processor or server that ultimately uses corrected altitude data in a position solution computation as described above.

Generally, altitude correction data generator 110 comprises at least an input/output (I/O) interface 112, a processor 114, and a memory/storage unit 116. Similarly, aircraft altitude corrector 120 comprises at least an input/output (I/O) interface 122, a processor 124, and a memory/storage unit 126. Each processor 114, 124 can be, for example, a microprocessor, a microcontroller, a digital signal processor, etc. Each I/O interface 112, 122 can be one or more devices, e.g., Ethernet card or module, configured to enable communications over a network according to any of a variety of networking protocols. Each memory/storage unit 116, 126 can be a tangible processor-readable or computer-readable memory that stores or is encoded with instructions that, when executed by processor 114, 124 cause the processor to perform the functions described herein. For example, memory/storage unit 116 is encoded with logic for aggregating or organizing forecast atmospheric pressure data and for calculating altitude correction data in a suitable format. Memory/storage unit 116 can also store both received forecast atmospheric pressure data and calculated altitude correction data. Likewise, memory/storage unit 126 is encoded with logic for determining a corrected altitude of an aircraft based on the altitude correction data and can store altitude correction data and corrected altitude values as necessary.

While FIG. 1 shows a processing environment comprising data processors 114, 124 that execute software stored in memory/storage devices 116, 126, an alternative processing environment is a fixed data processing element, such as an application specific integrated circuit (ASIC) that is configured, through fixed hardware logic, to perform logic functions. Yet another possible data processing environment is one involving one or more field programmable logic devices, or a combination of fixed processing elements and programmable logic devices. In one form, logic may be embodied in a tangible processor-readable medium that is encoded with instructions for execution by a processor that, when executed by the processor, operate to cause the processor to perform the functions described herein.

The architecture depicted in FIG. 1 is conceptual to illustrate major functional units, and does not necessarily illustrate physical relationships or imply any specific implementation. For example, while FIG. 1 separately depicts altitude correction data generator 110 and aircraft altitude corrector 120, each with its own interface, processor, and memory/storage, these modules can be implemented either with separate hardware, firmware, and/or software as shown or can be integrated to any degree using common hardware, firmware, and/or software as practical or efficient in particular contexts.

Figure 2:
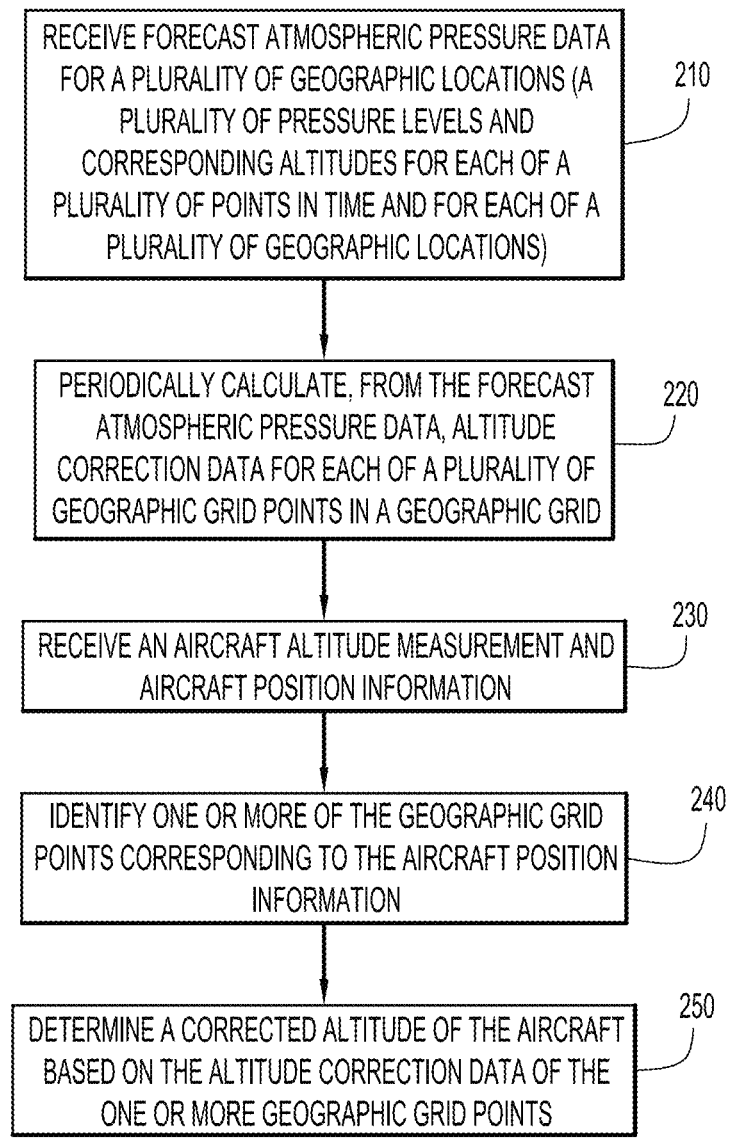
FIG. 2 is a top-level flow diagram illustrating operations performed to generate corrected aircraft altitude in accordance with the inventive concepts described herein.

FIG. 2 is a top-level functional flowchart illustrating operations performed by an altitude correction system to generate corrected aircraft altitude. In relation to the architecture shown in FIG. 1, operations 210 and 220 shown in FIG. 2 are performed periodically by altitude correction data generator 110, while operations 230, 240, and 250 are performed by aircraft altitude corrector 120 when aircraft position and altitude measurement are received.

Figure 6A:
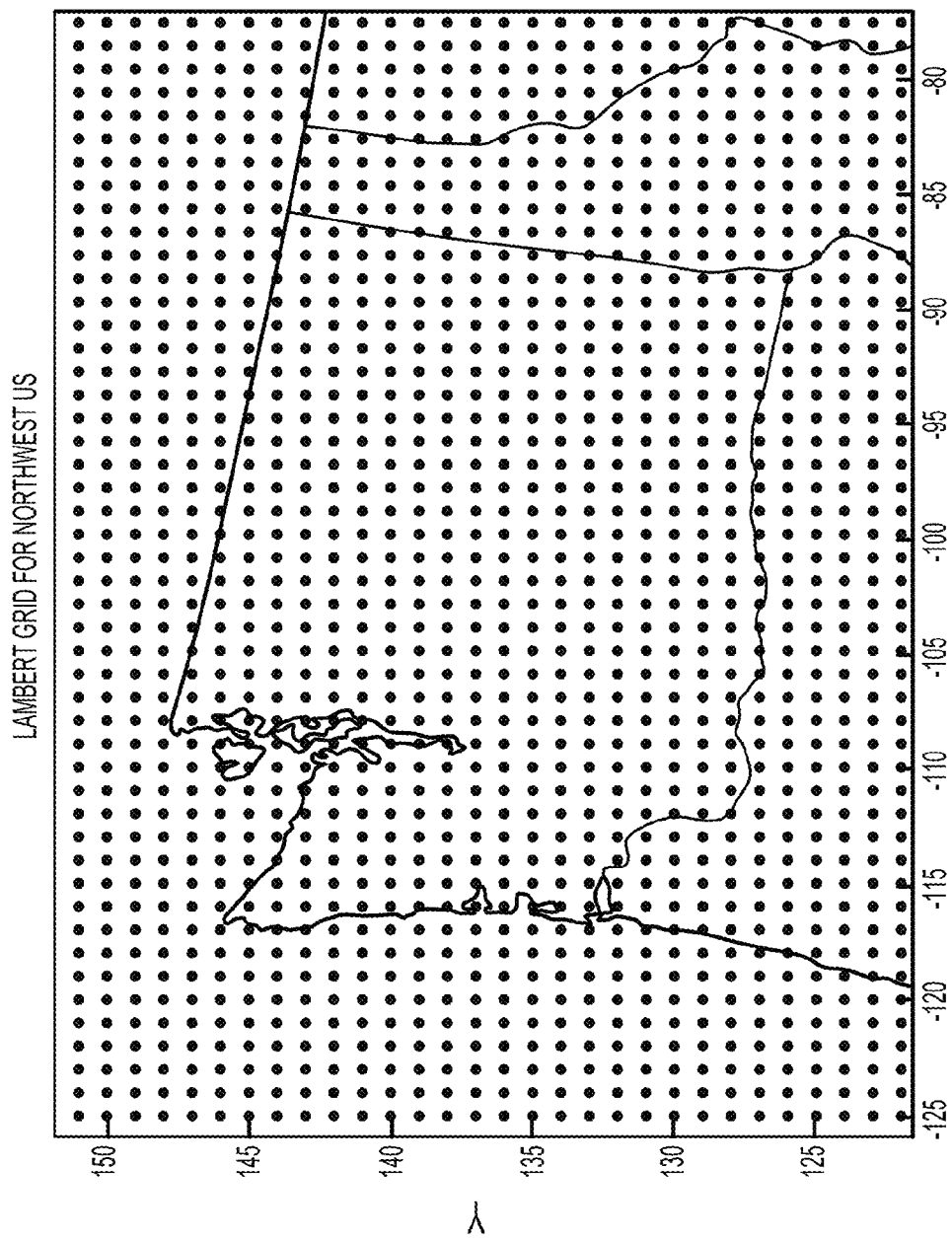
FIGS. 6A and 6B are graphs respectively showing grid points for a Lambert coordinate system and a latitude/longitude coordinate system overlaying a map of the northwest continental U.S.
Figure 6B:
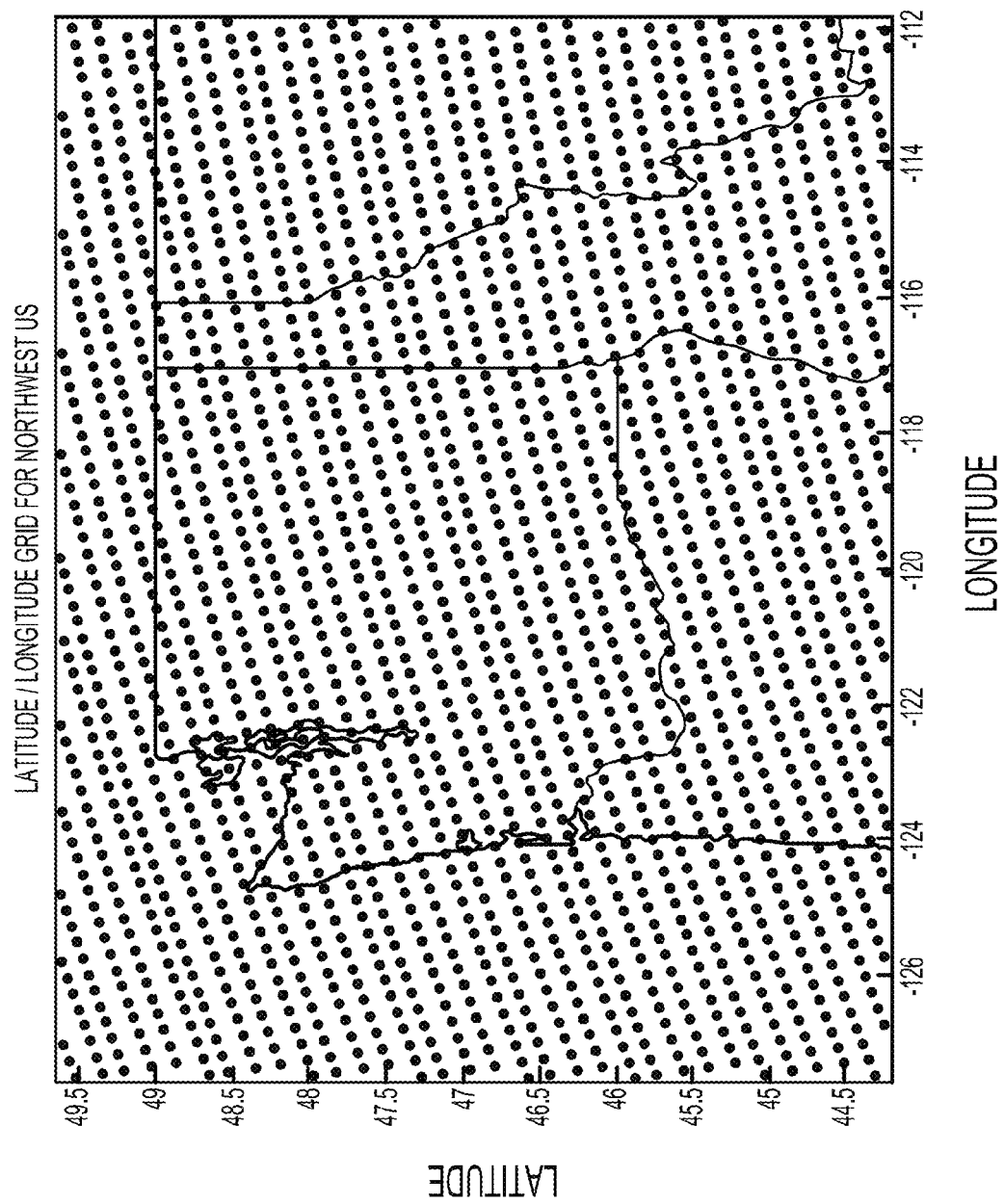

In operation 210, altitude correction data generator 110 receives forecast atmospheric pressure data from a weather forecasting service, such as RUC HGT data from NOAA. As previously noted, the RUC HGT data contains geopotential height (equivalent to true altitude) data for up to 50 different isobars (contours of constant pressure) for a set of specific geographic locations. In particular, the geographic locations are a two-dimensional array of grid points in the Lambert coordinate system, which is a commonly used coordinate system formed by a conformal conic projection (the projection seats a cone over the sphere of the Earth and projects conformally onto the cone). The Lambert grid points can be spaced at regular intervals in the two-dimensional array, such as at 40, 20, or 13 km as previously described. An example of grid points in the Lambert coordinate system for the northwest continental U.S. is shown in FIG. 6A. Due to the regular spacing, the grid points can be specified by indexed Cartesian coordinates $(x_i, y_j)$, where i=1, . . . , n and j=1, . . . , m. FIG. 6B shows, by contrast, the same portion of the U.S. mapped in the latitude/longitude coordinate system in which aircraft typically report their position.

The RUC HGT data is segmented into files that are delivered sequentially, with each file containing geopotential height data (true altitude) at a particular constant-pressure isobar (i.e., a specific barometric pressure) for each grid point in the Lambert conformal grid. By aggregating the data from several such files at different isobars, altitude correction data generator 110 can construct a three dimensional table or database of true altitude values, with two dimensions being the (x,y) coordinates of the Lambert grid and the third dimension being a column of barometric pressures (isobars) at each grid point. The RUC HGT is also segmented by forecast time. That is, the geopotential height values are forecast for future time instants for a number of points in time from the time at which they are generated, including: 0 (current time), 1, 3, 6, 9, 12, 15, and 18 hours. Each HGT file provides the geopotential height for one time and one constant isobar pressure for all Lambert grid points. Thus, altitude correction data generator 110 essentially aggregates the same three dimensional table of geopotential height values for a plurality of forecast times (i.e., a most recently received "current" value and a number of future forecast values), in effect, a four dimensional table or database. According to one implementation described herein for illustration, altitude correction data generator 110 can store, for each Lambert grid point, vectors of current isobars and the forecasts. Each vector is organized as a sequence of, for example, 37 numbers corresponding to the geopotential heights (true altitude) at 37 isobar values.

When new HGT data arrives, it replaces the previous data. For reasons explained below, of greatest interest are the most recently received "current" HGT data and the closest future forecast HGT data. For example, if the most recent HGT data was received 30 minutes ago, the last "current" data presently corresponds to a time 30 minutes in the past, and the closest forecast data (i.e., for one hour later than the last "current" data) corresponds to a future time 30 minutes from the present. If for some reason no new HGT data is received for another 30 minutes, the one-hour forecast data would become the last "current" HGT data, and the three-hour forecast data would become the closest future forecast data. Likewise, if three hours passed without receiving any new HGT data, the three-hour forecast HGT data would become the last current HGT data.

Though RUC HGT data delivery outages are anticipated to be rare, altitude correction data generator 110 can keep track and report the aging status and outages of RUC HGT data. In particular, it may take up to an hour and 45 minutes to receive a complete set of RUC HGT data, so under normal circumstance, no data should be older than this amount of time. Thus, if the age of oldest data in the current forecast is, for example, greater than two hours, a notification or alarm is generated by altitude correction data generator 110. Altitude correction data generator 110 can nevertheless continue to operate in a "coasting" mode by making the RUC HGT data from successive forecast times the "current" RUC HGT data as time elapses. This coasting mode can be continued during an outage of up to 18 hours, which is the maximum forecast time provided by the RUC HGT product.

Once the time of applicability of all forecast times has passed, all forecast data is stale and unreliable, and altitude correction data generator 110 ceases to supply altitude correction data.

Referring again to FIG. 2, in operation 220, altitude correction data generator 110 periodically calculates from the forecast atmospheric pressure data, a column of altitude correction data for each geographic grid point. If an aircraft provided its measured barometric pressure value, the aggregated RUC HGT data could be used directly to correct altitude. Unfortunately, aircraft instead provide the "pressure altitude value," i.e., the pressure recast into the altitude using the Standard Atmospheric Model table (or formula). Consequently, some form of translation or conversion is required to apply the RUC HGT data to correct aircraft altitude. From a computational standpoint, this conversion issue can be addressed in a number of ways. For example, reported altitude data can be converted back to a barometric pressure value based on the standard pressure-altitude relationships used to generate the reported altitude (e.g., a table or formula), and then this pressure value can be compared to the RUC HGT isobar values to identify the corresponding true altitude. Another approach is to compute at the altitude correction data generator 110 "altitude offsets" that correspond to incremental standard altitude values, such that the altitude offsets can be applied directly to the reported altitude to determine the corrected altitude.

Yet another approach takes advantage of the fact that both the aggregated HGT true altitude data and the standard atmospheric model table can be indexed by the same barometric pressure values, such that a direct conversion from reported altitude to corrected altitude can be performed using pressure isobar index values without actually involving barometric pressure values in the computation. According to this approach, the altitude correction data comprises true altitude values (rather than altitude offset values), and it is not necessary to compute altitude offsets at the altitude correction data generator or to convert reported altitude to pressure values at the aircraft altitude corrector. Thus, the periodically generated altitude correction data can take a number of forms including, but not limited to: a set of isobar pressure-true altitude pairs for each grid point; a set of altitude offset values for a respective set of standard reported altitude values for each grid point; and a vector of true altitude (geopotential height) values indexed by predetermined barometric pressure values.

Since the RUC HGT data is supplied in Lambert coordinates, the altitude correction data can conveniently be maintained in Lambert coordinates. However, since aircraft report their positions in latitude and longitude, it is also possible to convert the altitude correction data to a latitude/longitude coordinate grid via bivariate interpolation of the RUC HGT data from the Lambert grid points to avoid coordinate conversion in aircraft altitude corrector 120.

The periodic generation of the altitude correction data can be as simple as determining which RUC HGT data is closest in time to the current time, and using that set of RUC HGT data to compute the altitude correction data. For example, if the RUC HGT data for the last "current" time was received 15 minutes ago, that data is offset in time by 15 minutes from the present time, while the one-hour forecast data is offset by 45 minutes in the future relative to the present time. Thus, the last "current" RUC HGT data would be used. On the other hand, if the last "current" RUC HGT data is 45 minutes old, the one-hour forecast data would be closer in time to the present time and used instead.

Figure 3:
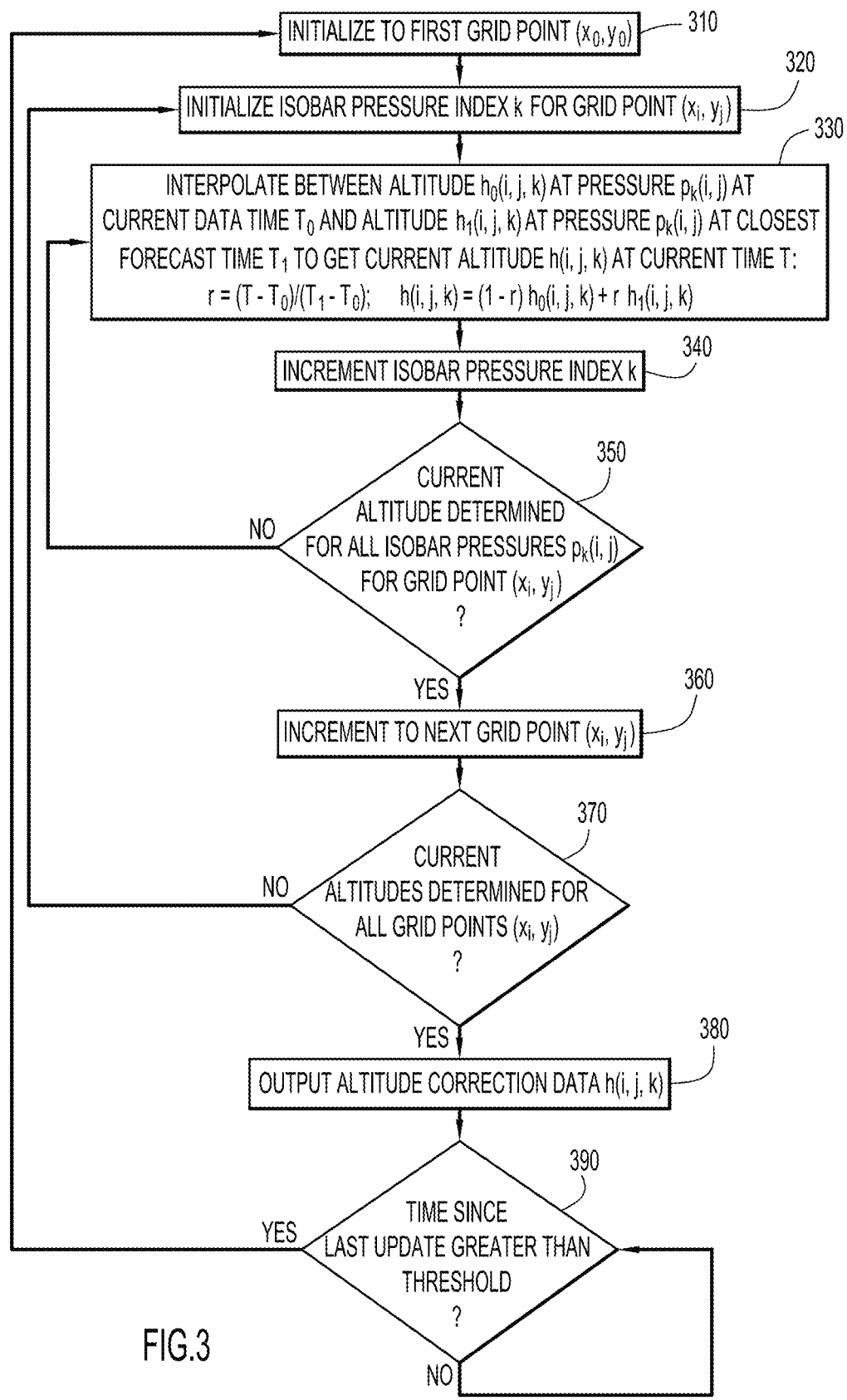
FIG. 3 is a flow diagram illustrating operations performed to generate altitude correction data from forecast atmospheric pressure data according to an example implementation of the inventive concepts described herein.

According to a more accurate approach, a time interpolation relative to the present time can be performed between the last "current" RUC HGT data and the next forecast RUC HGT data to periodically provide current altitude correction data. FIG. 3 is a flow diagram illustrating one example of the time-interpolation computations performed. In this example, the time interpolation calculations are performed directly using the RUC HGT data, though it will be understood that the altitude correction data could be converted to other formats (e.g., altitude offsets) before performing the time interpolation.

Referring to FIG. 3, after initializing to a first grid point $(x_0, y_0)$ (e.g., Lambert or lat./long. coordinates) in operation 310, and initializing a pressure isobar index k for that grid point $(x_i, y_i)$ in operation 320, a time interpolation is performed at that grid point and pressure level in operation 330. In particular, a linear, univariate time interpolation between altitude $h_0(i,j,k)$ at pressure $p_k(i,j)$ at the last "current" data time $T_0$ and altitude $h_1(i,j,k)$ at that same pressure $p_k(i,j)$ at the closest forecast time $T_1$ is performed to get the current altitude $h(i,j,k)$ at present time T as follows:

$$r=(T-T_0)/(T_1-T_0) \qquad (1)$$

$$h(i,j,k)=(1-r)h_0(i,j,k)+rh_1(i,j,k) \qquad (2)$$

After incrementing the pressure isobar index k in operation 340, a determination is made in operation 350 as to whether the present time altitude has been computed for all pressure isobar levels $p_k(i,j)$ for the this grid point $(x_i,y_j)$. If not, processing returns to operation 330 to perform the time interpolation at the next pressure level. If so, the grid point $(x_i, y_j)$ is incremented in operation 360. Though omitted from FIG. 3 for simplicity, the processing would proceed through the two-dimensional grid of points by incrementing indices i and j in nested loops. If, in operation 370, it is determined that the present time altitudes have been determined for all grid points $(x_i, y_j)$, in operation 380, the current altitude correction data $h(i,j,k)$ are supplied to aircraft altitude corrector 120 (operation 380). Otherwise, processing returns to operation 320 to compute the present time altitudes for the next grid point. After completing the time interpolation processing for all grid points and pressure levels, in operation 390, the time since the last update of the altitude correction data is compared to a threshold to determine whether another time update should be performed. By way of example, the altitude correction data can be updated in this manner every five minutes.

Referring again to the top-level flow diagram of FIG. 2, each time an aircraft position is reported, operations 230, 240, and 250 are performed by aircraft altitude corrector 120 in the example implementation shown in FIG. 1. In operation 230, aircraft altitude corrector 120 receives, for a particular aircraft, the reported altitude (based on measured barometric pressure at the aircraft) and aircraft position information in the form of latitude and longitude coordinates. In operation 240, one or more of the geographic grid points corresponding to the aircraft position are identified and, in operation 250, the corrected altitude of the aircraft is determined based on the altitude correction data of the one or more geographic grid points identified in operation 240. As previously explained, from a computational standpoint, there are a number of ways to format the altitude correction data and to apply that data to the reported altitude to arrive at the corrected altitude according to operations 240 and 250.

Figure 4:
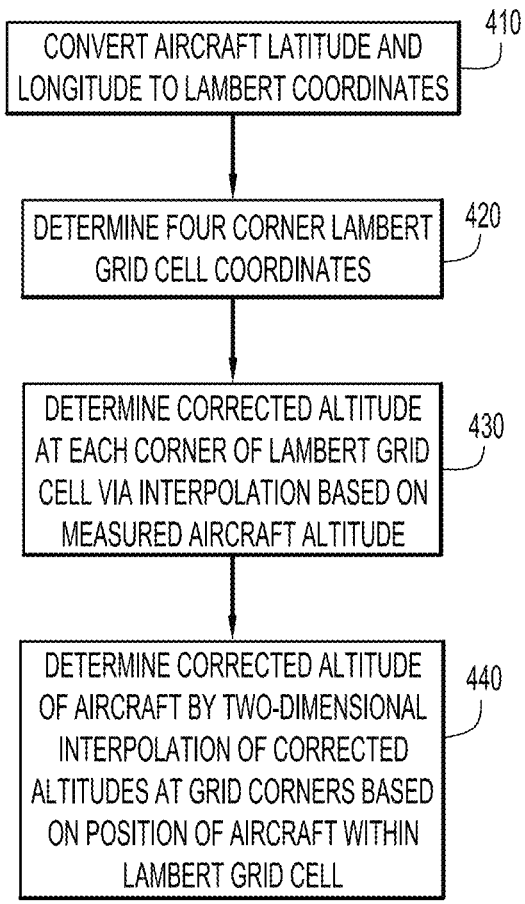
FIG. 4 is a flow diagram illustrating operations performed to generate corrected aircraft altitude from measured altitude and altitude correction data according to an example implementation of the inventive concepts described herein.

One such approach will be described in detail in connection with the flow diagram of FIG. 4. This approach assumes that the altitude correction data is provided in Lambert coordinates (x,y) and includes true altitude values (geopotential height) indexed by the barometric pressure isobar values. In other words, the altitude correction data can be provided directly from the RUC HGT data (e.g., via a linear time interpolation to the present time). As will be explained in greater detail in the example below, this approach requires the aircraft position to be converted from latitude/longitude ($\phi$, $\lambda$) to Lambert coordinates, but the reported altitude measurement can be used directly in the calculation of the corrected altitude. Further, the actual pressure isobar values do not need to be supplied or used in the computations.

In operation 410, the received aircraft latitude and longitude coordinates are converted to the Lambert coordinate system. The transformation of the latitude, longitude pair ($\phi$, $\lambda$) to the Lambert coordinate system is performed with the assumption of spherical Earth as follows.

$$Q = \frac{1}{2}\ln\left(\frac{1+\sin\varphi}{1-\sin\varphi}\right) \quad (3)$$

$$R = Ke^{-QL} \quad (4)$$

$$\gamma = (\lambda_0 - \lambda) \quad (5)$$

where $\phi_0$ and $\lambda_0$ are reference latitude and longitude given in Table 1 below. L depends on the reference latitude:

$$L = \sin \phi_0 \quad (6)$$

and K is mapping radius at the equator (Table 1):

$$K = R_{Earth}\cot\phi_0 e^{Q_0 L}, \quad Q_0 = \frac{1}{2}\ln\left(\frac{1+L}{1-L}\right) \quad (7)$$

$R_{Earth}$ being the Earth's radius (Table 1).

The relative easting E and northing N (in meters) is then calculated as $$E = R \sin(\gamma) \quad (8)$$

$$N = R_0 - R \cos(\gamma) \quad (9)$$

where $R_0$ is mapping radius at reference latitude, $$R_0 = R_{Earth} \cot \phi_0 \quad (10)$$

The conversion from the easting and northing is done accordingly to the equations:

$$x = \frac{E - E_S}{\delta_x} \quad (11)$$

$$y = \frac{N - N_S}{\delta_y} \quad (12)$$

where $E_s$ and $N_s$ are the easting and northing corresponding to seed coordinates $\phi_s$ and $\lambda_s$, and $\delta_x$ and $\delta_y$ are the grid step sizes (Table 1).

TABLE 1

| Parameter | Meaning | Units | Value |
| --- | --- | --- | --- |
| $\phi_0$ | Reference latitude | ° | 25.0 |
| $\lambda_0$ | Reference longitude | ° | -95.0 |
| L | $\sin\phi_0$ | | 0.4226183 |

TABLE 1-continued

| Parameter | Meaning | Units | Value |
| --- | --- | --- | --- |
| $R_{Earth}$ | Earth radius | m | $6.371229 \times 10^6$ |
| K | Mapping radius at equator | m | $1.653121 \times 10^7$ |
| $R_0$ | Mapping radius at reference latitude | m | $1.366314 \times 10^7$ |
| $\phi_s$ | Grid seed latitude | ° | 16.281 |
| $\lambda_s$ | Grid seed longitude | ° | -126.38 |
| $E_s$ | Seed easting | m | -163.000 |
| $N_s$ | Seed northing | m | -27.9838 |
| $\delta_x$ | Grid size in East-West direction | m | $2.0138 \times 10^4$ |
| $\delta_y$ | Grid size in North-South direction | m | $2.0138 \times 10^4$ |

The foregoing coordinate conversion essentially converts the latitude and longitude coordinates reported by the aircraft into x and y values that lies somewhere within the Lambert coordinate system. According to one approach, operation 240 in FIG. 2 (identifying one or more grid points corresponding to the aircraft position) can be performed by finding the nearest Lambert grid point to the (x,y) position specified by the values obtained via equations (11) and (12), and using the altitude correction data for this nearest neighbor Lambert grid point. Since the Lambert grid points are specified by integer values, the nearest neighbor grid point can be identified by rounding the x and y values of the aircraft position given by equations (11) and (12) to the nearest integer.

However, in the embodiment described in connection with FIG. 4, a more accurate approach is to identify the four Lambert coordinate grid points that define the four corners of a square cell within which the aircraft position lies (operation 420). The coordinates of the four corner points of the Lambert grid cell can be readily determined from the x and y values computed in equations (11) and (12). Specifically, combinations of the two integer x values that bound the x aircraft position and the two integer y values that bound the y aircraft position form the coordinates of the four corner grid points of the Lambert cell. For example, if the aircraft position was determined to be (3.267, 7.339), the four grid points for the altitude correction data would be (3,7), (4,7), (3,8), and (4,8). Computationally, the coordinates of the first corner grid point are the integer portions of the aircraft (x, y) position, the coordinates of the second corner grid point are the integer value of x plus 1 and the integer value of y; the coordinates of the third corner grid point are the integer values of x and the integer value of y plus 1; and the coordinates of the fourth corner grid point are the integer value of x plus 1 and the integer value of y plus 1.

Once the corner coordinates have been determined, in operation 430, the corrected altitude can be determined at each corner grid point of the Lambert cell. As previously described, the corrected altitude data can be provided in a number of different formats. In this example, the altitude correction data comprises a vector organized as a sequence of 37 numbers corresponding to the present-time geopotential heights (true altitude) at 37 standard isobar values. This approach takes advantage of the fact that the nominal, standard atmosphere model altitude used by aircraft to compute reported altitude from measured barometric pressure is known and can also be represented as a vector of 37 values at these same 37 standard isobar values, as shown in Table 2 below.

TABLE 2

U.S. Standard Atmosphere Isobars

| Pressure (hPa) | Geopotential Altitude (m) |
|---|---|
| 100 | 16,180 |
| 125 | 14,765 |
| 150 | 13,608 |
| 175 | 12,631 |
| 200 | 11,784 |
| 225 | 11,037 |
| 250 | 10,363 |
| 275 | 9,741 |
| 300 | 9,164 |
| 325 | 8,624 |
| 350 | 8,117 |
| 375 | 7,639 |
| 400 | 7,185 |
| 425 | 6,754 |
| 450 | 6,344 |
| 475 | 5,951 |
| 500 | 5,574 |
| 525 | 5,213 |
| 550 | 4,865 |
| 575 | 4,530 |
| 600 | 4,206 |
| 625 | 3,894 |
| 650 | 3,591 |
| 675 | 3,297 |
| 700 | 3,012 |
| 725 | 2,735 |
| 750 | 2,466 |
| 775 | 2,204 |
| 800 | 1,949 |
| 825 | 1,700 |
| 850 | 1,457 |
| 875 | 1,220 |
| 900 | 988 |
| 925 | 762 |
| 950 | 540 |
| 975 | 323 |
| 1000 | 111 |

Since the 37 values in each of the two vectors are indexed by the same pressure isobars, a simple univariate interpolation can be performed at each corner grid point to obtain the corrected altitude at each corner grid point. Specifically, assume the list of 37 standard isobar altitude values $h_i^{st}$ in Table 2 are indexed from top to bottom by the integers i=1 to 37, and the corresponding true altitude values $h_i^{tr}$ at a grid point for these same 37 isobar pressures are similarly indexed by the integers i=1 to 37. The reported altitude is compared to the values shown in Table 2 to determine which two standard altitude values bound the reported altitude (i.e., the altitude value just below and the altitude value just below). For example, if the reported altitude was 12,000 meters, the bounding standard altitudes would be 13,608 m (at 150 hPa) and 12,631 m (at 175 hPa), and the relevant indices would be 3 and 4, respectively. To interpolate to the corrected altitude at a corner grid point, assume the reported altitude is denoted by $h_r$, the lower bounding standard altitude is denoted by $x_0$, the higher bounding standard altitude is denoted by $x_1$, and the correspondingly indexed true altitudes are $h_0$ and $h_1$. The corrected altitude h at the grid point is then computed by interpolating as follows:

$$r=(h_r-x_0)/(x_1-x_0) \tag{13}$$

$$h=(1-r)h_0+rh_1 \tag{14}$$

This process is repeated at each of the four grid points that constitute the corners of the Lambert cell within which the aircraft position lies. It will be appreciated that, instead of linearly interpolating to determine the corrected altitude at each corner grid point, the "closest" corrected altitude could be selected; however, this would result in a loss of accuracy relative to the interpolated altitude value.

Referring again to FIG. 4, once the corrected altitude is determined for each corner grid point in the Lambert cell containing the aircraft position, in operation 440, the corrected altitude of the aircraft can be determined by two-dimensional (bivariate) interpolation of the corrected altitudes at the grid corners based on the position of the aircraft within the Lambert grid cell. Assume the Lambert coordinates of the measured aircraft position are (x,y), the coordinates of the four corner grid points are $(x_0,y_0)$, $(x_1,y_0)$, $(x_0,y_1)$, and $(x_1,y_1)$, and the corrected altitudes at the four corner grid points are respectively $h_{0,0}$, $h_{1,0}$, $h_{1,0}$, $h_{1,1}$. The corrected aircraft altitude h is then computed by:

$$h=(1-p)(1-q)h_{0,0}+p(1-q)h_{1,0}+q(1-p)h_{0,1}+pqh_{1,1} \tag{15}$$

where $$p = \frac{x-x_0}{x_1-x_0}, \quad q = \frac{y-y_0}{y_1-y_0} \tag{16}$$

As previously described, this corrected altitude value can then be supplied to a multilateration computation to generate a more accurate position solution than with the original reported altitude. The corrected altitude can also be reported to a third party, such as the FAA or an air traffic control installation.

Figure 5A:
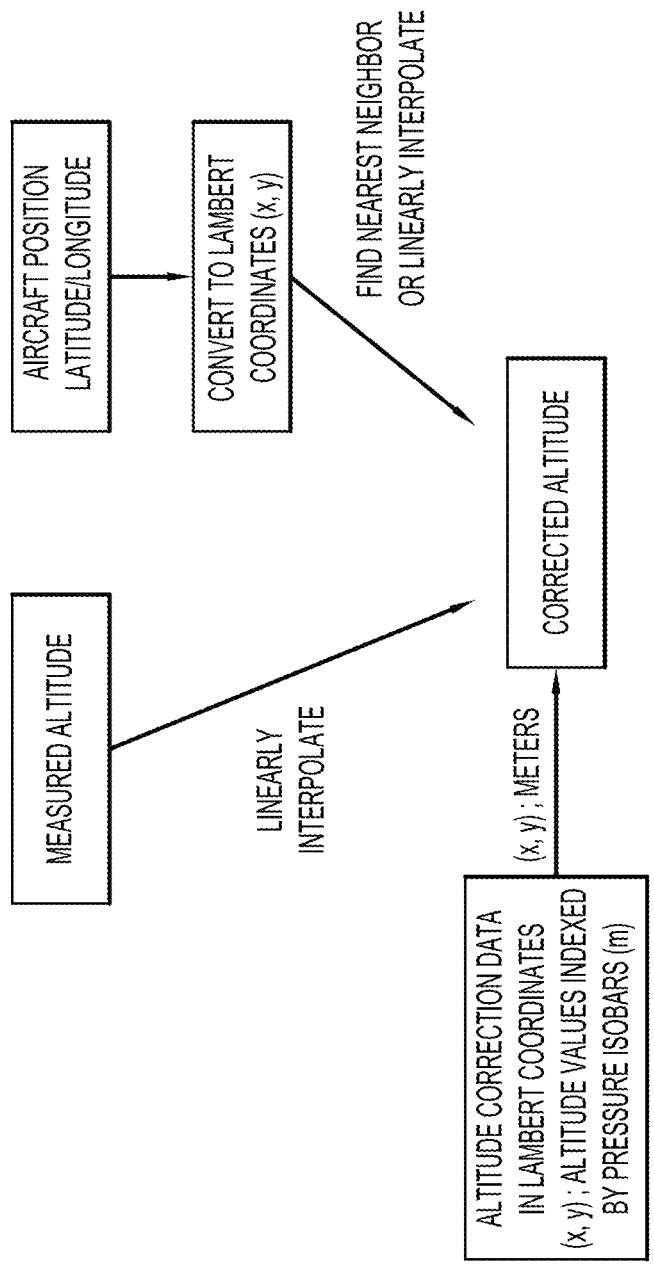

FIGS. 5A-5D illustrate at a conceptual level some of the options for carrying out the altitude correction computations. It will be appreciated that other variations and combinations of computational approaches that are within the scope of the invention exist, and the schemes shown in these figures are merely illustrative. In FIG. 5A, the scheme described in connection with FIG. 4 is employed in which the altitude correction data is provided in Lambert coordinates (x,y) and includes true altitude values (geopotential height) indexed by the barometric pressure isobar values. In other words, the altitude correction data can be provided directly from the RUC HGT data (e.g., via a linear time interpolation to the present time). As previously explained, this approach requires the aircraft position to be converted from latitude/longitude ($\phi$, $\lambda$) to Lambert coordinates, but the reported altitude measurement can be used directly in the calculation of the corrected altitude. Further, the actual isobar pressure values do not need to be supplied or used in the computations.

In the approach shown in FIG. 5B, the altitude correction data is supplied in Lambert coordinates (x,y), again requiring conversion of the aircraft position from latitude/longitude ($\phi$, $\lambda$) to Lambert coordinates. In this example, the reported altitude measurement is converted to a barometric pressure value according to the know pressure-altitude relationship used to generate the reported altitude from the measure barometric pressure at the aircraft (e.g., the Standard Atmospheric Model table or the corresponding formula). The resulting pressure value is compared to the pressure values in the altitude correction data, and the corresponding true altitude is identified.

Figure 5C:
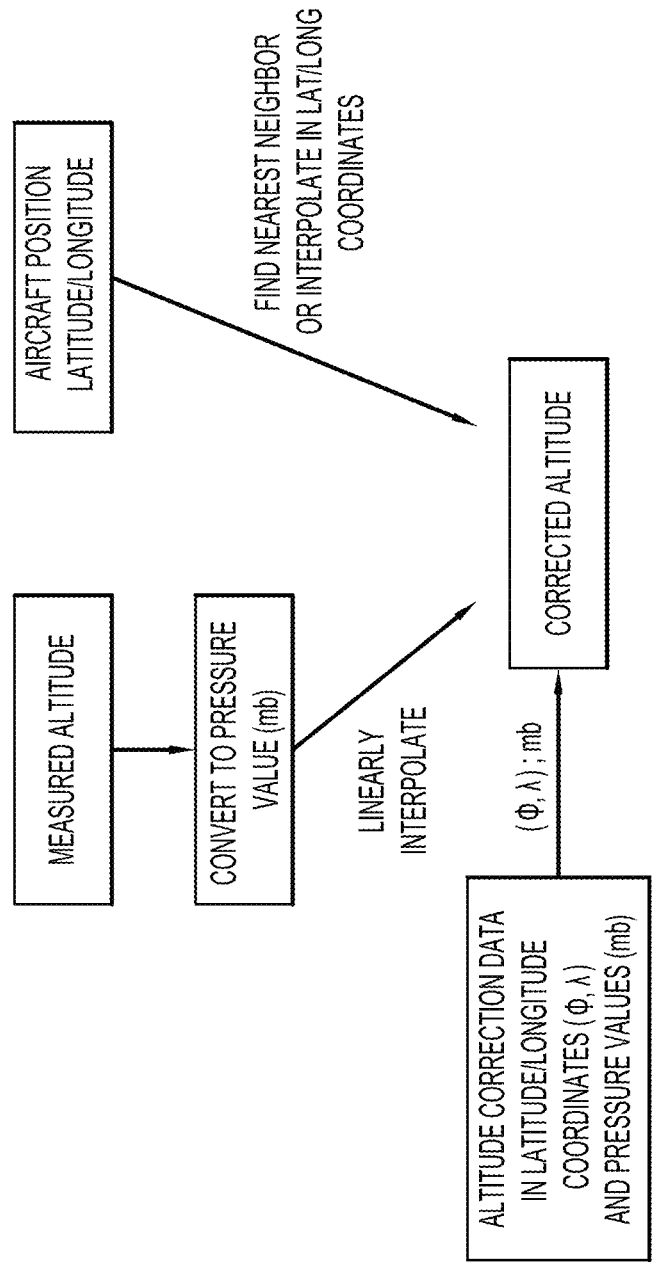
Figure 5D:
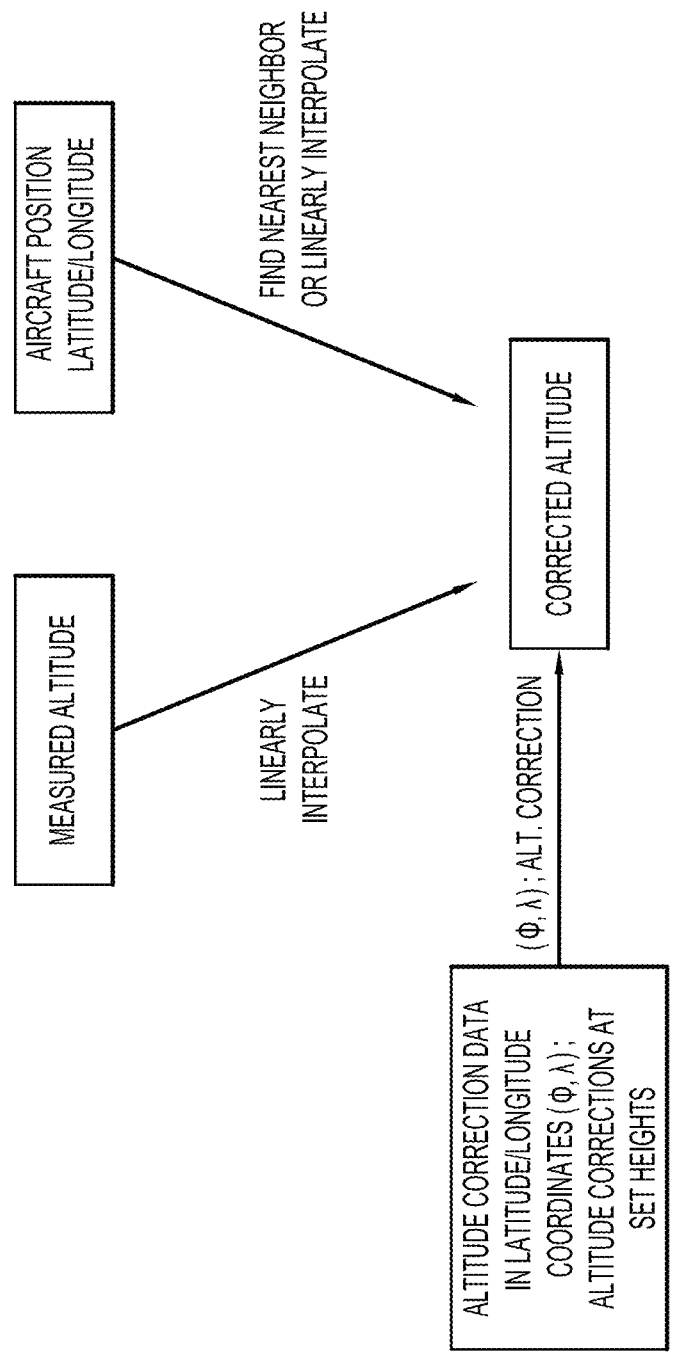

In the approach shown in FIG. 5C, the same scheme is applied to determine the corrected altitude (i.e., conversion of the reported altitude to a barometric pressure values); however, the altitude correction data is converted to latitude/longitude coordinates ($\phi$,$\lambda$) such that the aircraft position can be compared to the altitude correction data without conversion to Lambert coordinates. Finally, in FIG. 5D, both the reported altitude and the aircraft position do not require any conversion to compute the corrected altitude. In this approach, the altitude correction data is converted to latitude/longitude coordinates ($\phi$, $\lambda$) and altitude "offset" values are computed in advance by the altitude correction data generator, which can be applied directly to the reported altitude (e.g., via interpolation) to obtain the corrected altitude. It will be appreciated that the interpolation schemes described above in connection with FIG. 4 can be adapted for applicability to the approaches shown in FIGS. 5B-D or any other variations.

Having described example embodiments of a new and improved technique for reducing altitude error using forecasted atmospheric pressure data, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for reducing altitude error in an altitude measurement made at an aircraft, the method comprising:
   receiving, at a processor, forecast atmospheric pressure data for a plurality of geographic locations, the forecast atmospheric pressure data including, for each of a plurality of points in time and for each geographic location, a plurality of pressure levels corresponding to a respective plurality of altitudes;
   periodically calculating via the processor, from the forecast atmospheric pressure data, altitude correction data for each of a plurality of geographic grid points in a geographic grid, the altitude correction data indicating geopotential altitudes at the geographic grid points for the points in time;
   receiving the aircraft altitude measurement made at the aircraft and aircraft position information indicating an aircraft position of the aircraft;
   identifying one or more of the geographic grid points corresponding to the aircraft position information;
   generating a corrected altitude of the aircraft from the altitude correction data of the identified one or more geographic grid points, the corrected altitude being the geopotential altitude of the aircraft for the aircraft altitude measurement; and
   reporting the corrected altitude as the altitude of the aircraft.

2. The method of claim 1, wherein calculating the altitude correction data comprises computing, for individual geographic grid points, geopotential altitude values by interpolating between the forecast atmospheric pressure data for two points in time.

3. The method of claim 2, wherein calculating the altitude correction data further comprises, for each of a plurality of pressure levels at individual geographic grid points, interpolating between geopotential altitude values forecasted for the two points in time at a pressure level to compute the geopotential altitude value at the pressure level.

4. The method of claim 1, wherein:
   identifying one or more of the geographic grid points comprises identifying a set of geographic grid points whose locations define a region surrounding the aircraft position; and
   determining the corrected altitude of the aircraft comprises:
      determining the geopotential altitude at each of the set of geographic grid points based on the aircraft altitude measurement; and
      computing the geopotential altitude of the aircraft by interpolating among the geopotential altitudes at the set of geographic grid points based on a relative location of the aircraft position and the set of geographic grid points.

5. The method of claim 1, wherein the altitude correction data comprises, for each of the geographic grid points, a plurality of geopotential altitude values for a respective plurality of pressure levels, and wherein determining the geopotential altitude at each of the set of geographic grid points comprises:
   identifying first and second pressure levels corresponding to first and second geopotential altitude values bounding the aircraft altitude measurement; and
   computing the geopotential altitude at each of the set of geographic grid points by interpolating between geopotential altitude values for the first and second pressure levels as a function of the aircraft altitude measurement relative to the first and second geopotential altitude values at the first and second pressure levels.

6. The method of claim 1, wherein the altitude correction data comprises, for each of the geographic grid points, a plurality of geopotential altitude values for a respective plurality of pressure levels, and wherein determining the geopotential altitude at each of the set of geographic grid points comprises:
   converting the aircraft altitude measurement to a measured pressure value based on a nominal relationship between pressure and altitude;
   identifying first and second pressure levels that bound the measured pressure level; and
   computing the geopotential altitude at each of the set of geographic grid points by interpolating between geopotential altitude values for the first and second pressure levels as a function of the measured pressure value relative to the first and second pressure levels.

7. The method of claim 1, wherein the points in time include a generation time at which the forecast atmospheric pressure data were generated and future times for which atmospheric pressures are forecast beyond the generation time and generating the corrected altitude comprises:
   generating, for at least one of the future times, the corrected altitude of the aircraft from the altitude correction data of the identified one or more geographic grid points.

8. The method of claim 7, wherein calculating the altitude correction data comprises computing, for individual geographic grid points, geopotential altitude values by interpolating between the forecast atmospheric pressure data for two of the future times.

9. The method of claim 8, wherein calculating the altitude correction data further comprises, for each of a plurality of pressure levels at individual geographic grid points, interpolating between geopotential altitude values forecasted for the two future times at a pressure level to compute a current altitude value at the pressure level.

10. The method of claim 7, wherein the altitude correction data comprises, for each of the geographic grid points, a plurality of geopotential altitude values for a respective plurality of pressure levels for the generation time and the future times, and wherein determining the geopotential altitude at each of the set of geographic grid points comprises:

identifying first and second pressure levels corresponding to first and second geopotential altitude values bounding the aircraft altitude measurement; and computing the geopotential altitude for the generation time and the future times at each of the set of geographic grid points by interpolating between geopotential altitude values for the first and second pressure levels as a function of the aircraft altitude measurement relative to the first and second geopotential altitude values at the first and second pressure levels.

11. The method of claim 7, wherein the altitude correction data comprises, for each of the geographic grid points, a plurality of geopotential altitude values for a respective plurality of pressure levels for the generation time and the future times, and wherein determining the geopotential altitude at each of the set of geographic grid points comprises:

converting the aircraft altitude measurement to a measured pressure value based on a nominal relationship between pressure and altitude;

identifying first and second pressure levels that bound the measured pressure level; and computing the geopotential altitude for the generation time and the future times at each of the set of geographic grid points by interpolating between geopotential altitude values for the first and second pressure levels as a function of the measured pressure value relative to the first and second pressure levels.

12. An apparatus to reduce altitude error in an altitude measurement made at an aircraft, the apparatus comprising:

at least one interface configured to receive:

forecast atmospheric pressure data for a plurality of geographic locations, the forecast atmospheric pressure data including, for each of a plurality of points in time and for each geographic location, a plurality of pressure levels corresponding to a respective plurality of altitudes; and the aircraft altitude measurement made at the aircraft, and aircraft position information indicating an aircraft position of the aircraft; and at least one processor configured to:

periodically calculate from the forecast atmospheric pressure data, altitude correction data for each of a plurality of geographic grid points in a geographic grid, the altitude correction data indicating geopotential altitudes at the geographic grid points for the points in time;

identify one or more of the geographic grid points corresponding to the aircraft position information;

generate a corrected altitude of the aircraft based on the altitude correction data of the one or more geographic grid points, the corrected altitude being the geopotential altitude of the aircraft for the aircraft altitude measurement; and reporting the corrected altitude as the altitude of the aircraft.

13. The apparatus of claim 12, wherein the processor is configured to calculate the altitude correction data by computing, for individual geographic grid points, a plurality of geopotential altitude values by interpolating between the forecast atmospheric pressure data for two points in time.

14. The apparatus of claim 12, wherein the processor is configured to identify one or more of the geographic grid points by identifying a set of geographic grid points whose locations define a region surrounding the aircraft position; and wherein the processor is configured to determine the corrected altitude of the aircraft by:

determining a corrected altitude at each of the set of geographic grid points based on the aircraft altitude measurement, the corrected altitude being the geopotential altitude of the aircraft for the aircraft altitude measurement; and computing the corrected altitude of the aircraft by interpolating among the geopotential altitudes at the set of geographic grid points based on a relative location of the aircraft position and the set of geographic grid points.

15. The apparatus of claim 12, wherein the points in time include a generation time at which the forecast atmospheric pressure data were generated and future times for which atmospheric pressures are forecast beyond the generation time and the processor is configured to generate the corrected altitude by:

generating, for at least one of the future times, the corrected altitude of the aircraft from the altitude correction data of the identified one or more geographic grid points.

16. The apparatus of claim 15, wherein the processor is configured to determine the corrected altitude at each of the set of geographic grid points by interpolating between altitude values at two of the future times based on the aircraft altitude measurement.

17. A non-transitory computer readable medium encoded with software comprising processor-executable instructions that, when executed by a processor, cause the processor to:

receive forecast atmospheric pressure data for a plurality of geographic locations, the forecast atmospheric pressure data including, for each of a plurality of points in time and for each geographic location, a plurality of pressure levels corresponding to a respective plurality of altitudes;

periodically calculate, from the forecast atmospheric pressure data, altitude correction data for each of a plurality of geographic grid points in a geographic grid, the altitude correction data indicating geopotential altitudes at the geographic grid points for the points in time;

measure aircraft altitude at an aircraft;

receive the aircraft altitude measurement made at the aircraft, and aircraft position information indicating an aircraft position of the aircraft;

identify one or more of the geographic grid points corresponding to the aircraft position information;

generate a corrected altitude of the aircraft based on the altitude correction data of the one or more geographic grid points, the corrected altitude being the geopotential altitude of the aircraft for the aircraft altitude measurement; and report the corrected altitude as the altitude of the aircraft.

18. The computer readable medium of claim 17, wherein the instructions to identify one or more of the geographic grid points comprise instructions that cause the processor to identify a set of geographic grid points whose locations define a region surrounding the aircraft position; and wherein the instructions to generate the corrected altitude of the aircraft comprise instructions that cause the processor to:

determine the geopotential altitude at each of the set of geographic grid points based on the aircraft altitude measurement; and compute the geopotential altitude of the aircraft by interpolating among the geopotential altitudes at the set of geographic grid points based on a relative location of the aircraft position and the set of geographic grid points.

19. The computer readable medium of claim 17, wherein the points in time include a generation time at which the forecast atmospheric pressure data were generated and future times for which atmospheric pressures are forecast beyond the generation time and wherein the instructions to generate the corrected altitude comprise instructions that cause the processor to:

generate, for at least one of the future times, the corrected altitude of the aircraft from the altitude correction data of the identified one or more geographic grid points.

20. The computer readable medium of claim 19, wherein the instructions to calculate the altitude correction data comprise instructions that cause the processor to compute, for individual geographic grid points, a plurality of geopotential altitude values by interpolating between the forecast atmospheric pressure data for two of the future times.

\* \* \* \* \*